United States Patent
Bauer et al.

(10) Patent No.: US 9,914,440 B2
(45) Date of Patent: Mar. 13, 2018

(54) HYDRAULIC BRAKE SYSTEM AND METHOD FOR OPERATING A HYDRAULIC BRAKE SYSTEM

(71) Applicant: Robert Bosch GmbH, Stuttgart (DE)

(72) Inventors: Urs Bauer, Sachsenheim (DE);
Karl-Heinz Willmann, Freiberg (DE);
Werner Quirant, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/106,537

(22) PCT Filed: Oct. 27, 2014

(86) PCT No.: PCT/EP2014/072984
§ 371 (c)(1),
(2) Date: Jun. 20, 2016

(87) PCT Pub. No.: WO2015/096914
PCT Pub. Date: Jul. 2, 2015

(65) Prior Publication Data
US 2017/0001612 A1    Jan. 5, 2017

(30) Foreign Application Priority Data
Dec. 23, 2013    (DE) .......................... 10 2013 227 066

(51) Int. Cl.
*B60T 8/44*    (2006.01)
*B60T 8/40*    (2006.01)

(52) U.S. Cl.
CPC ............ *B60T 8/442* (2013.01); *B60T 8/4081* (2013.01)

(58) Field of Classification Search
CPC ...... B60T 8/442; B60T 8/4081; B60T 13/168; B60T 13/686
See application file for complete search history.

(56) References Cited

U.S. PATENT DOCUMENTS

| 5,277,483 A | 1/1994 | Yosida et al. |
| 2013/0241273 A1* | 9/2013 | Kim ..................... B60T 13/142 |
| | | 303/6.01 |

(Continued)

FOREIGN PATENT DOCUMENTS

| DE | 102010040097 | 3/2011 |
| DE | 102012210809 | 1/2013 |

(Continued)

OTHER PUBLICATIONS

International Search Report dated Jan. 7, 2015, of the corresponding International Application PCT/EP2014/072984, filed on Oct. 27, 2014.

*Primary Examiner* — Vishal R Sahni
(74) *Attorney, Agent, or Firm* — Norton Rose Fulbright US LLP

(57) ABSTRACT

A hydraulic braking system and a method for operating the hydraulic braking system. The hydraulic braking system has a first pressure generating unit and a second pressure generating unit. The first pressure generating unit is hydraulically interruptibly and uncircumventably connected to the second pressure generating unit via a first interrupting element in such a way that with the first interrupting means in a closed position, a hydraulic connection between the first and second pressure generating unit is no longer possible.

19 Claims, 1 Drawing Sheet

(56) References Cited

U.S. PATENT DOCUMENTS

| | | | |
|---|---|---|---|
| 2014/0008966 A1* | 1/2014 | Hotani | B60T 8/4081 303/14 |
| 2014/0028084 A1* | 1/2014 | Biller | B60T 8/4081 303/9.62 |
| 2014/0203626 A1* | 7/2014 | Biller | B60T 8/4081 303/10 |
| 2016/0023644 A1* | 1/2016 | Feigel | B60T 8/4081 303/3 |
| 2016/0221553 A1* | 8/2016 | Watanabe | B60T 7/042 |

FOREIGN PATENT DOCUMENTS

| | | |
|---|---|---|
| EP | 2671770 | 12/2013 |
| WO | 97/02165 A1 | 1/1997 |
| WO | 2012/143312 A1 | 10/2012 |
| WO | WO2012143175 | 10/2012 |
| WO | WO20122143312 | 10/2012 |
| WO | WO2012146461 | 11/2012 |

* cited by examiner

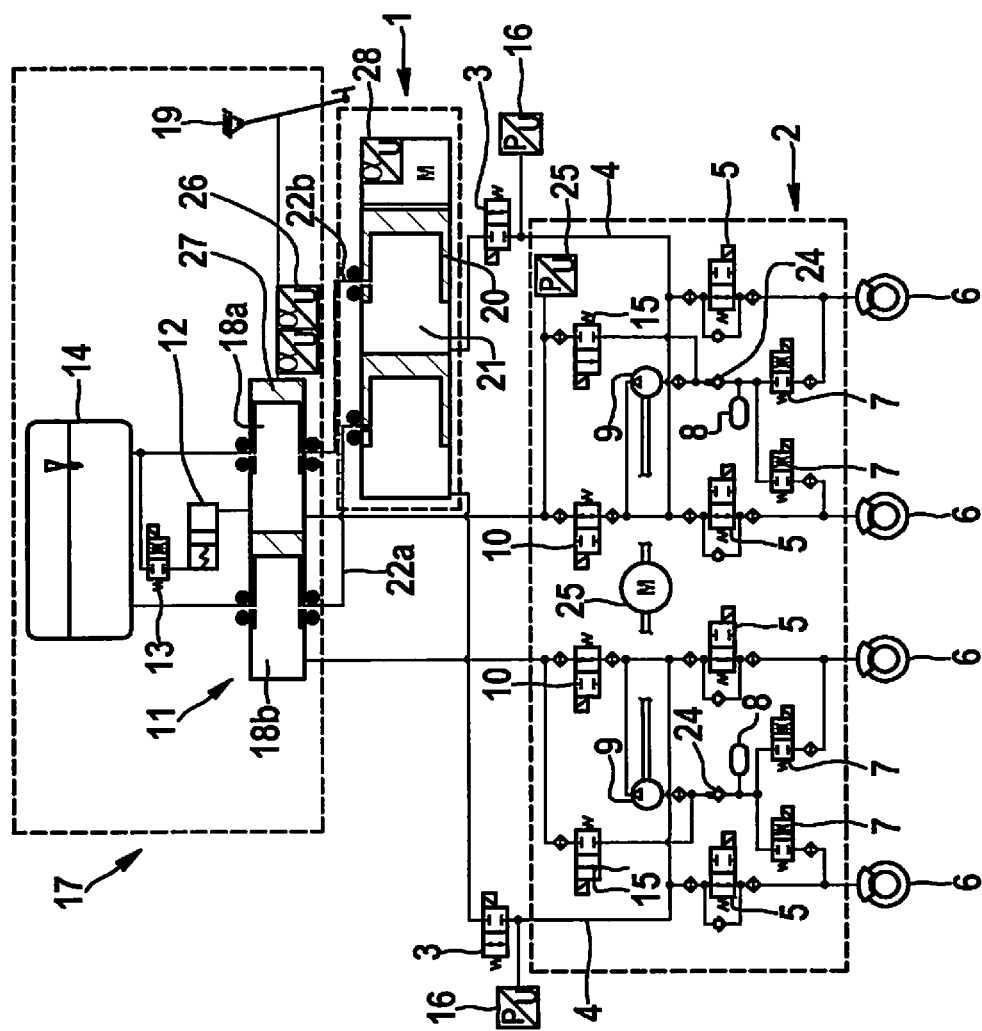

HYDRAULIC BRAKE SYSTEM AND METHOD FOR OPERATING A HYDRAULIC BRAKE SYSTEM

BACKGROUND INFORMATION

German Patent Application No. DE 10 2010 040097 A1 describes a braking system for motor vehicles that can be activated both by the vehicle driver and independently of the vehicle driver. The braking system described has, inter alia, an electrohydraulic pressure furnishing device that delivers a braking system pressure, as well as a pressure modulation unit that has, for each wheel brake, an inlet valve as well as an outlet valve for establishing individual-wheel brake pressures. In order to avoid inconvenience to the vehicle driver in particular in the event of a failure of the electrical system of the motor vehicle, it is proposed according to the invention that switch-in valves electrically actuatable for each circuit be interposed between the pressure furnishing device and the pressure modulation unit, which valves, in an activated state, create a hydraulic connection between the pressure furnishing device and the pressure modulation unit.

SUMMARY

An example hydraulic braking system according to the present invention encompasses a first pressure generating unit as well as a second pressure generating unit. The first pressure generating unit is hydraulically interruptibly and uncircumventably connected to the second pressure generating unit via first interrupting element. With the first interrupting element in a closed position, a hydraulic connection between the first pressure generating unit and the second pressure generating unit is thus no longer possible.

One implementation of the first pressure generating unit can be a plunger that can actively displace a volume of brake fluid and thus build up pressure. The second pressure generating unit can be implemented by a known ESP hydraulic assembly for wheel pressure modulation. Connection of the plunger and hydraulic assembly is effected via uncircumventable isolation valves that are located in the hydraulic connection between the plunger and assembly. These isolation valves explicitly have no check valves introduced in parallel, and in a closed position they enable complete hydraulic isolation between the plunger and hydraulic assembly. Advantageously, two possibilities thus exist for pressure buildup in the braking system, both of which enable active pressure establishment. As a result of the uncircumventable connection between the first and the second brake pressure generating unit via the isolation valves, it is possible to avoid the occurrence of feedback effects toward the plunger from the pressure buildup by way of the hydraulic assembly. It is also impossible for pressure spikes, or pressure buildup within the hydraulic assembly with the isolation valves closed, to travel via the plunger back to the driver and negatively affect him or her in terms of pedal feel.

In an advantageous refinement the second pressure generating device has at least one hydraulic connector that is hydraulically connected to the first interrupting element, i.e., the uncircumventable isolation valves. The isolation valves are in this context physically separated from the second pressure generating device. The physical separation of the isolation valves from the hydraulic assembly makes possible a more flexible installation of the entire braking system. The isolation valves can also, for example, be physically integrated into the plunger, or can be present as an added-on part for the hydraulic assembly. Because the additional isolation valves are not installed in the hydraulic assembly, it is possible to use an only slightly modified hydraulic assembly that is physically very similar to a standard assembly from manufacturers. Synergistic effects in manufacturing the hydraulic assemblies can thereby be utilized.

In a refinement of the hydraulic braking system, at least one pressure transducer is connected between the first interrupting means and the hydraulic connector of the hydraulic assembly. A pressure transducer of this kind is, for example, a pressure sensor that is connected between the isolation valves and the hydraulic connector. A pressure that is delivered on the part of the plunger to the hydraulic assembly can advantageously be determined on the basis of this pressure sensor, and the plunger can thereby be controlled even more accurately.

In a refinement of the hydraulic braking system, the first brake pressure generating device and the second brake pressure generating device are in hydraulic communication with a brake master cylinder. This makes it possible for both the plunger and the first brake pressure generating device, as well as the hydraulic assembly, to be supplied with hydraulic fluid via the brake master cylinder and the reservoir connected thereto.

In an embodiment of the hydraulic braking system, pressure can be built up at the wheel brake cylinders of the braking system, independently of the driver, both by way of the first brake pressure generating device and by way of the second brake pressure generating device. This ensures redundant provision of pressure in the braking system. In the event of failure of one of the brake pressure generating units a brake pressure can then be built up by way of the other brake pressure generating unit, enhancing the safety of the entire system.

In an embodiment of the hydraulic braking system, the first interrupting element is connectable, via the hydraulic connector of the second brake pressure generating device, via at least one wheel inlet valve, and via at least one wheel outlet valve, to a hydraulic accumulator of the second pressure generating device.

This connection can also be accomplished additionally via the corresponding wheel brake cylinders. The hydraulic connectability of the plunger, constituting a first brake pressure generating device, to the hydraulic accumulator of the second brake pressure generating device advantageously enables a pressure equalization in the context of regenerative braking, which can be necessary in order to adapt a hydraulic braking torque to a regenerative braking torque.

In addition, hydraulic fluid received in the hydraulic accumulator can be delivered back to the plunger from the hydraulic accumulator.

In an advantageous embodiment the second pressure generating device has a hydraulic conveying device that is connected to the hydraulic accumulator and is part of the second pressure generating device. A hydraulic conveying device of this kind is present in the hydraulic assembly in the form of a pump, for example a return delivery pump. The provision of such a pump in the hydraulic assembly additionally makes possible, alongside the known functionalities of wheel pressure modulation in ESP mode, the aforementioned redundancy upon failure of the plunger, and thus enhances safety.

Advantageously the hydraulic conveying device in the form of the pump of the hydraulic assembly is in hydraulically uncircumventable communication with a further interrupting element. Via the further interrupting element the hydraulic conveying device can be connected to a brake master cylinder in such a way that with the second interrupting means in a closed state, no hydraulic connection exists between the hydraulic conveying device and the brake master cylinder. In contrast to conventional isolation valves of wheel-pressure-modulating hydraulic assemblies, pulsing at the brake pedal upon operation of the pump is therefore not detectable by the driver, since no hydraulic flow is possible when further isolation valves between the pump and brake master cylinder are closed. This results in enhanced operating convenience.

In a further embodiment of the hydraulic brake system according to the present invention, it encompasses a brake master cylinder that is in hydraulic communication with a simulator device. The simulator device is connected on the input side to the brake master cylinder and on the output side via a simulator shutoff valve to an equalization container of the braking system. The simulator shutoff valve is not part of the second pressure generating device. The driver can thus actuate a pedal simulator during normal operation, his or her accustomed pedal feel being supplied to him or her as a result. This simulator can be shut off, however, by switching the shutoff valve, which means that the simulator can be (at least in part) rendered inoperative by opening the shutoff valve.

In a further embodiment, the simulator device is connected on the output side both to the brake master cylinder and to the equalization container via the simulator shutoff valve.

By way of the hydraulic braking system, for the case in which the volume of hydraulic fluid available on the part of the first pressure generating device is less than a first limit volume (V limit), hydraulic fluid is conveyable by way of the hydraulic conveying device, i.e., the pump, out of the equalization container. The second brake pressure generating device can thus continue to ensure brake pressure buildup in backup mode even in the event of a defect in the first brake pressure generating device.

In an embodiment of the hydraulic braking system, the hydraulic accumulator is hydraulically connected together with the input side of the hydraulic conveying device via third interrupting means between the brake master cylinder and the second interrupting means. A volume of brake fluid can thereby be delivered back out of the hydraulic accumulator directly toward the brake master cylinder, and thus also to the equalization container, i.e., to the reservoir.

The method according to the present invention for operating a hydraulic braking system that has a first pressure generating unit as well as a second pressure generating unit, the first pressure generating unit being hydraulically interruptibly and uncircumventably connected in such a way to the second pressure generating unit via first interrupting element, prevents a hydraulic connection between the first pressure generating unit and second pressure generating unit when the first interrupting means is in a closed position. In a first operating mode the wheel brake pressure in the at least one wheel brake cylinder is generated solely by way of the first brake pressure generating device and is directed via the first interrupting element. It is thus possible to define unequivocally in the method according to the present invention, based on the position of the first interrupting means, whether the first brake pressure generating unit is participating in a braking operation. As compared with systems of the existing art, feedback from the second brake pressure generating unit, for example via pressure spikes and/or pressure fluctuations, is no longer possible if the valve between the plunger and hydraulic assembly is closed.

In an embodiment of the method according to the present invention, in a second operating mode the wheel brake pressure is built up by the driver by way of a brake master cylinder and is directed via second interrupting element to the at least one wheel brake cylinder. The second interrupting element can also, however, connect the wheel brake cylinders uncircumventably to the brake master cylinder in such a way that with the second interrupting means in a closed state, no hydraulic connection exists between the wheel brake cylinder and brake master cylinder. It is thus possible to decide by way of the positioning of the second interrupting means whether, in a backup mode, the driver can be connected directly to the wheel brake cylinders or whether that connection is completely interrupted. In the opened position a direct feedthrough to the wheel brakes is possible for the driver, and emergency braking can be carried out. In the closed state the driver cannot build up any pressure at the wheel brakes, and the system is in an operating mode in which the driver simply needs to act on the simulator and the wheel brake pressure is built up by the plunger.

In a further embodiment of the method, if the volume of hydraulic fluid available on the part of the first brake pressure generating device is less than a first limit volume, or in the event of failure of the first brake pressure generating device, hydraulic fluid is conveyed out of an equalization container by way of the hydraulic conveying device that is part of the second brake pressure generating device, and brake pressure buildup is thereby ensured.

BRIEF DESCRIPTION OF THE DRAWING

FIG. 1 shows an example braking system according to the present invention.

DETAILED DESCRIPTION OF EXAMPLE EMBODIMENTS

The braking system according to the present invention encompasses three main elements.

The braking system encompasses, on the one hand, a brake master cylinder 11 that is supplied with hydraulic fluid from a hydraulic fluid reservoir 14. A brake master cylinder 11 of this kind can be, for example, a conventional tandem brake master cylinder made up of two chambers that are in hydraulic communication with hydraulic fluid reservoir 14 via respective orifices. At least one of chambers 18a and 18b of the brake master cylinder is connected to a pedal simulator 12 that encompasses, for example, a piston-cylinder assemblage as well as an elastic element that can transmit to a driver upon actuation of the braking system a pedal feel that he or she expects upon actuation. A pedal feel is made up, for example, of a pedal force/pedal travel characteristic curve that corresponds to the respective pedal feel. The pedal simulator is furthermore lockable by way of a valve 13 that opens and/or closes the hydraulic connection of a rear chamber of pedal simulator 12 to hydraulic fluid reservoir 14. Intermediate positions of the valve are likewise conceivable. The pedal simulator can thus be switched to be active and then back to inactive again as required, depending on the position of valve 13. Valve 13 can moreover also have additional throttling functions that allow it to modify the pedal characteristic.

Brake master cylinder 11 can be impinged upon with force in conventional fashion by a driver via a brake input element 19, for example a brake pedal or brake lever, and can thereby effect a braking operation. Depending on the position of valve 13, pedal simulator 12 can be impinged upon by force or alternatively, as presented below, braking at wheel brake cylinders 6 can also be achieved directly.

In the present braking system, the driver actuates brake master cylinder 11 in unboosted fashion, i.e., with no additional assistance on the part of a brake booster. The braking system has a corresponding sensor suite 26 in order to sense the driver's braking input, i.e., in order to specify the deceleration of the vehicle desired by the driver. This can be, for example, a redundant travel sensor suite for sensing the pedal travel upon brake actuation, or also a force sensor suite for sensing the pedal force. Braking input sensing can also be accomplished alone and/or in interaction with braking force transducer 25 that is explained below.

The braking system encompasses as a further constituent, a first pressure generating unit 1 that is capable of impinging upon hydraulic fluid with force and thereby making it available under pressure to the rest of the braking system or at least to parts thereof. First pressure generating unit 1 can be present, for example, in the form of a plunger that has at least one piston 20 as well as at least one hydraulic chamber 21. Hydraulic chamber 21 can be constituted by the piston and by a wall of a cylinder receiving the piston. It is also possible, as depicted in FIG. 1, for the plunger to be a double plunger that makes a respective hydraulic chamber available to each brake circuit of the braking system.

Chambers 21 of the plunger are connected via hydraulic lines 2a and 22b to the corresponding chambers 18a and 18b of brake master cylinder 11. In the case in which the plunger having a single chamber is present, only a single branched hydraulic line 22a exists and is then in hydraulic communication with both chambers 18a and 18b of brake master cylinder 11. Hydraulic fluid can be delivered to the plunger via hydraulic lines 22a and optionally 22b; said fluid can travel from hydraulic fluid reservoir 14 through brake master cylinder 11—through chambers 18a and 18b thereof—to plunger 1. Hydraulic lines 22a and 22b thus correspond to supply lines of the plunger. Enough hydraulic fluid is thereby available to the plunger in order to achieve braking later on by displacement of hydraulic fluid. In order to displace hydraulic fluid, the plunger additionally encompasses at least one drive motor that can impart motion to one or more pistons 20 of the plunger and thus push volume out of the internal volume of the plunger.

A third constituent of the braking system according to the present invention is a second brake pressure generating unit 2 in the form of a modulation device. A device of this kind is known as an ESP hydraulic assembly, but it is adapted in certain aspects for use according to the present invention. The second brake pressure generating device encompasses, for each hydraulic brake circuit, inlet valves 5 and outlet valves 7 respectively associated with the connected wheel brake cylinders 6, which valves can control in open- and/or closed loop fashion the supply of hydraulic fluid to the wheel brake cylinders. Connected in parallel with inlet valves 5 are check valves that prevent a hydraulic flow toward the wheel brake cylinders coming from plunger 1 and/or from brake master cylinder 11. The outlet valves are connected on the suction side to a return delivery pump 9. Also on the suction side, return delivery pump 9 is in hydraulic communication via a high-pressure switching valve 15 with one of chambers 18a or 18b of brake master cylinder 11. Located between outlet valves 7 and the suction-side connector of pump 9 is a check valve 24 that prevents a flow of hydraulic fluid from the pump toward outlet valves 7. A hydraulic accumulator 8 is hydraulically connected between outlet valve 7 and the check valve.

Pump 9 is in hydraulic communication at its discharge side with inlet valves 5, and simultaneously via switchover valves 10 with chambers 18a and 18b of brake master cylinder 11. Pump 9 is driven by a pump motor 28.

In contrast to conventional hydraulic assemblies for brake pressure modulation, a check valve is not connected in parallel with switchover valves 10 to which pump 9 is connected with its suction side. Switchover valves 9 connect inlet valves 5 uncircumventably to the chambers of brake master cylinder 11. With the switchover valve in a closed position, a hydraulic flow from the brake master cylinder toward wheel brake cylinders 6 is thus prevented.

Second brake pressure generating unit 2 furthermore has a respective hydraulic connector 4 that is in hydraulic communication with inlet valves 5, with the suction side of pump 9, and with switchover valves 10. Hydraulic connector 4 serves to connect plunger 1 to second brake pressure generating unit 2.

Plunger 1 is connected to hydraulic connectors 4 via isolation valves 3 that, in a closed state, completely prevent any connection between chambers 21 of plunger 1 and second brake pressure generating unit 2. Isolation valves 3 likewise have no check valves. The isolation valves are uncircumventably installed in the hydraulic connection from plunger 1 to second brake pressure generating unit 2.

Isolation valves 3 are not part of second brake pressure generating unit 2 and are present as separate components.

Brake pressure transducers 16, with which the pressure proceeding from plunger 1 is ascertainable, are provided between isolation valves 3 and connectors 4 of second brake pressure generating unit 2.

The primary brake circuit, i.e., the brake circuit that is connected to first chamber 18a of brake master cylinder 11, has between first chamber 18a and high-pressure switching valve 15 a connector for a further brake pressure transducer 25 that is part of the second brake pressure generating device.

Both brake master cylinder 11 and plunger 1 have so-called "orifices" that, by overrunning openings in the corresponding piston-cylinder assemblages, can close off communication of the respective chambers 18a or 18b in the brake master cylinder, or of the chamber(s) of plunger 21, with other components of the braking system. In the case of plunger 1, for example, an orifice in chamber 21, which is open with the plunger in the unactuated state, is closed off by way of a displacement of piston 20 by the electric motor. The hydraulic communication with brake master cylinder 11 is thereby interrupted. Analogously, the connection of chamber 18a to plunger 1 and to hydraulic fluid reservoir 14 can be closed off by displacing piston 27. The closing off of orifices also applies to the second chambers of brake master cylinder 11 or of plunger 1.

Alternatively, a high-pressure accumulator can also be used instead of plunger 1.

The example braking system according to the present invention that is depicted enables brake pressure buildup in various ways.

On the one hand the driver, as already indicated, can specify the braking input by pedal actuation. The brake pressure is established by way of first brake pressure generating device 1 in accordance with the braking input. In this context high-pressure switching valves 15 are in a closed state, inlet valves 5 to wheel brake cylinders 6 are closed, and the outlet valves of the wheels upon which pressure is to be impinged are closed.

Proceeding from chamber 21 of plunger 1, the hydraulic fluid that is present in the plunger is guided via isolation valves 3 into the second brake pressure generating device and can thus establish a brake pressure at wheel brake cylinders 6. The brake pressure can thus be built up, and can also be reduced again by retracting plunger piston 21.

Wheel pressure modulation can be carried out in conventional fashion by way of second brake pressure generating unit 2, for example by discharging hydraulic fluid out of wheel brake cylinders 6 via outlet valves 7 into hydraulic accumulator 8, or by delivering a volume of hydraulic fluid back by way of pumps 9. Wheel pressure modulation, in particular the buildup and reduction of pressure, can be accomplished in individual-wheel fashion.

In the event of failure of first pressure generating device 1, for example of plunger 1, brake pressure can be built up by way of second brake pressure generating unit 2. A fallback level thus exists in the braking system.

In addition, if the volume of hydraulic fluid available on the part of the first brake pressure generating device (2) is less than a first limit volume (V limit), hydraulic fluid can be delivered out of an equalization container (14) by way of a hydraulic conveying device (9) that is part of the second brake pressure generating unit (2).

In this actuating mode the driver actuates pedal simulator 12, with the result that pedal feel is conveyed.

The braking system likewise has a mechanical fallback level in which the driver can impinge upon the wheel brake cylinders with pressure exclusively mechanically, directly by way of the pedal force applied by the driver, and thus can still achieve a braking effect. This can be necessary, for example, in the event of a total vehicle electrical system failure.

In the context of regenerative braking operations a generator-mode braking effect of a drive motor operated as a generator can be blended in by way of the braking system by adapting the braking effect on the part of the plunger. When a generator-mode braking effect is switched in, the braking effect of the hydraulic braking system by way of the plunger is reduced. A necessary volume equalization in the context of regenerative braking can additionally be ensured in this context by way of the second brake pressure generating device, for example by receiving hydraulic fluid into hydraulic accumulator 8 when a regenerative braking effect is switched in. The operation of switching in or switching off a regenerative braking effect, or also a variable proportion of regenerative braking effect in terms of the total braking effect, remains entirely unnoticed by the driver at the brake pedal, since he or she is hydraulically decoupled from the rest of the braking system by the closed switchover and high-pressure switching valves 10 and 15.

What is claimed is:

1. A hydraulic braking system, comprising:
   a first pressure generating unit; and
   a second pressure generating unit including, for a controllable or regulatable supply of a connected wheel brake with hydraulic fluid, the following: (i) a wheel inlet valve associated with the wheel brake, (ii) a wheel outlet valve, and (iii) a hydraulic conveying device connected on a discharge side of the hydraulic conveying device to the wheel inlet valve;
   wherein the first pressure generating unit is hydraulically interruptibly and uncircumventably connected to the second pressure generating unit via a interrupting element in such a way that with the first interrupting element in a closed position, a hydraulic connection between the first pressure generating unit and the second pressure generating unit is no longer possible;
   wherein the second pressure generating unit has at least one hydraulic connector that is connected to the first interrupting element, the first interrupting element being hydraulically connected via the at least one hydraulic connector of the second pressure generating unit to a discharge side of the hydraulic conveying device of the second pressure generating unit;
   wherein the first interrupting is physically separated from the second pressure generating device;
   wherein the first interrupting element is connectable via the at least one hydraulic connector, the wheel inlet valve, the wheel outlet valve, and at least one wheel brake cylinder, to a hydraulic accumulator;
   wherein the hydraulic conveying device is hydraulically uncircumventably connected to a second interrupting element, which connects the hydraulic conveying device in such a way to a brake master cylinder that with the second interrupting element, in the closed state, no hydraulic connection exists between the hydraulic conveying device and the brake master cylinder;
   wherein the hydraulic conveying device of the second pressure generating unit is hydraulically connected on a suction side of the hydraulic conveying device to the wheel outlet valve; and
   wherein the hydraulic accumulator is hydraulically connected with the input side of the hydraulic conveying device, and together, the hydraulic accumulator and the input side of the hydraulic conveying device are hydraulically connected via a third interrupting element to a hydraulic connection between the brake master cylinder and the second interrupting element.

2. The hydraulic braking system as recited in claim 1, wherein at least one pressure transducer is connected between the first interrupting element and the hydraulic connector.

3. The hydraulic braking system as recited in claim 1, wherein the first pressure generating unit and the second pressure generating unit are in hydraulic communication with a the brake master cylinder.

4. The hydraulic braking system as recited in claim 1, wherein pressure is capable of being built up, independently of a driver, both by way of the first pressure generating unit and by way of the second pressure generating unit.

5. The hydraulic braking system as recited in claim 1, wherein the hydraulic accumulator is in communication with a hydraulic conveying device that is part of the second pressure generating unit.

6. The hydraulic braking system as recited in claim 1, wherein the brake master cylinder is in hydraulic communication with a simulator device, the simulator device being connected on an input side to the brake master cylinder and on an output side via a simulator shutoff valve to an equalization container of the braking system, the simulator shutoff valve not being part of the second pressure generating unit.

7. The hydraulic braking system as recited in claim 6, wherein the simulator device is connected on the output side both to the brake master cylinder and to the equalization container via the simulator shutoff valve.

8. The hydraulic braking system as recited in claim 6, wherein the hydraulic baking system is configured such that if the volume of hydraulic fluid available on the part of the second pressure generating unit is less than a first limit volume, hydraulic fluid is conveyed by way of the hydraulic conveying device out of the equalization container.

9. The hydraulic braking system as recited in claim 1, wherein the first interrupting element has no check valve in parallel with it.

10. The hydraulic braking system as recited in claim 9, wherein with the first interrupting element in a closed position, there is no hydraulic connection between the first pressure generating unit and the second pressure generating unit.

11. The hydraulic braking system as recited in claim 10, wherein the first pressure generating unit is a plunger and includes at least one piston and at least one hydraulic chamber, and wherein the second pressure generating unit has at least one hydraulic connector that is in communication with the first interrupting element, the first interrupting element being physically separated from the second pressure generating unit.

12. The hydraulic braking system as recited in claim 11, wherein the second pressure generating unit is an ESP hydraulic assembly.

13. A method for operating a hydraulic braking system, the hydraulic braking system including a first pressure generating unit; and a second pressure generating unit including, for a controllable or regulatable supply of a connected wheel brake with hydraulic fluid, the following: (i) a wheel inlet valve associated with the wheel brake, (ii) a wheel outlet valve, and (iii) a hydraulic conveying device connected on a discharge side of the hydraulic conveying device to the wheel inlet valve, wherein the first pressure generating unit is hydraulically interruptibly and uncircumventably connected to the second pressure generating unit via a interrupting element in such a way that with the first interrupting element in a closed position, a hydraulic connection between the first pressure generating unit and the second pressure generating unit is no longer possible, wherein the second pressure generating unit has at least one hydraulic connector that is connected to the first interrupting element, the first interrupting element being hydraulically connected via the at least one hydraulic connector of the second pressure generating unit to a discharge side of the hydraulic conveying device of the second pressure generating unit, wherein the first interrupting element is physically separated from the second pressure generating device, wherein the first interrupting element is connectable via the at least one hydraulic connector, the wheel inlet valve, the wheel outlet valve, and at least one wheel brake cylinder, to a hydraulic accumulator, wherein the hydraulic conveying device is hydraulically uncircumventably connected to a second interrupting element, which connects the hydraulic conveying device in such a way to a brake master cylinder that with the second interrupting element, in the closed state, no hydraulic connection exists between the hydraulic conveying device and the brake master cylinder, wherein the hydraulic conveying device of the second pressure generating unit is hydraulically connected on a suction side of the hydraulic conveying device to the wheel outlet valve, and wherein the hydraulic accumulator is hydraulically connected with the input side of the hydraulic conveying device, and together, the hydraulic accumulator and the input side of the hydraulic conveying device are hydraulically connected via a third interrupting element to a hydraulic connection between the brake master cylinder and the second interrupting element, the method comprising:

generating, in a first operating mode, a wheel brake pressure in at least one wheel brake cylinder solely by way of the first pressure generating unit via the first interrupting element.

14. The method as recited in claim 13, further comprising:
building up, in a second operating mode, the wheel brake pressure by a driver by way of a brake master cylinder, the wheel brake pressure being directed via a second interrupting element to the at least one wheel brake cylinder, the second interrupting element uncircumventably connecting the wheel brake cylinders to the brake master cylinder in such a way that with the second interrupting element, in a closed state, no hydraulic connection exists between the wheel brake cylinder and brake master cylinder.

15. The method as recited in claim 14, wherein hydraulic fluid is conveyed out of an equalization container by way of a hydraulic conveying device that is part of the second pressure generating unit if one of: a volume of hydraulic fluid available on the part of the first pressure generating unit is less than a first limit volume, or the first pressure generating unit fails.

16. The method as recited in claim 13, wherein the first interrupting element has no check valve in parallel with it.

17. The method as recited in claim 16, wherein with the first interrupting element in a closed position, there is no hydraulic connection between the first pressure generating unit and the second pressure generating unit.

18. The method as recited in claim 17, wherein the first pressure generating unit is a plunger and includes at least one piston and at least one hydraulic chamber, and wherein the second pressure generating unit has at least one hydraulic connector that is in communication with the first interrupting element, the first interrupting element being physically separated from the second pressure generating unit.

19. The method as recited in claim 18, wherein the second pressure generating unit is an ESP hydraulic assembly.

* * * * *